June 2, 1959 — P. DOBMEIER — 2,889,443

PORTABLE LUNCH WARMER

Filed Jan. 24, 1958 — 2 Sheets-Sheet 1

INVENTOR:
PAUL DOBMEIER
BY
Silverman, Mullin & Cass
ATT'YS

June 2, 1959 P. DOBMEIER 2,889,443
PORTABLE LUNCH WARMER
Filed Jan. 24, 1958 2 Sheets-Sheet 2
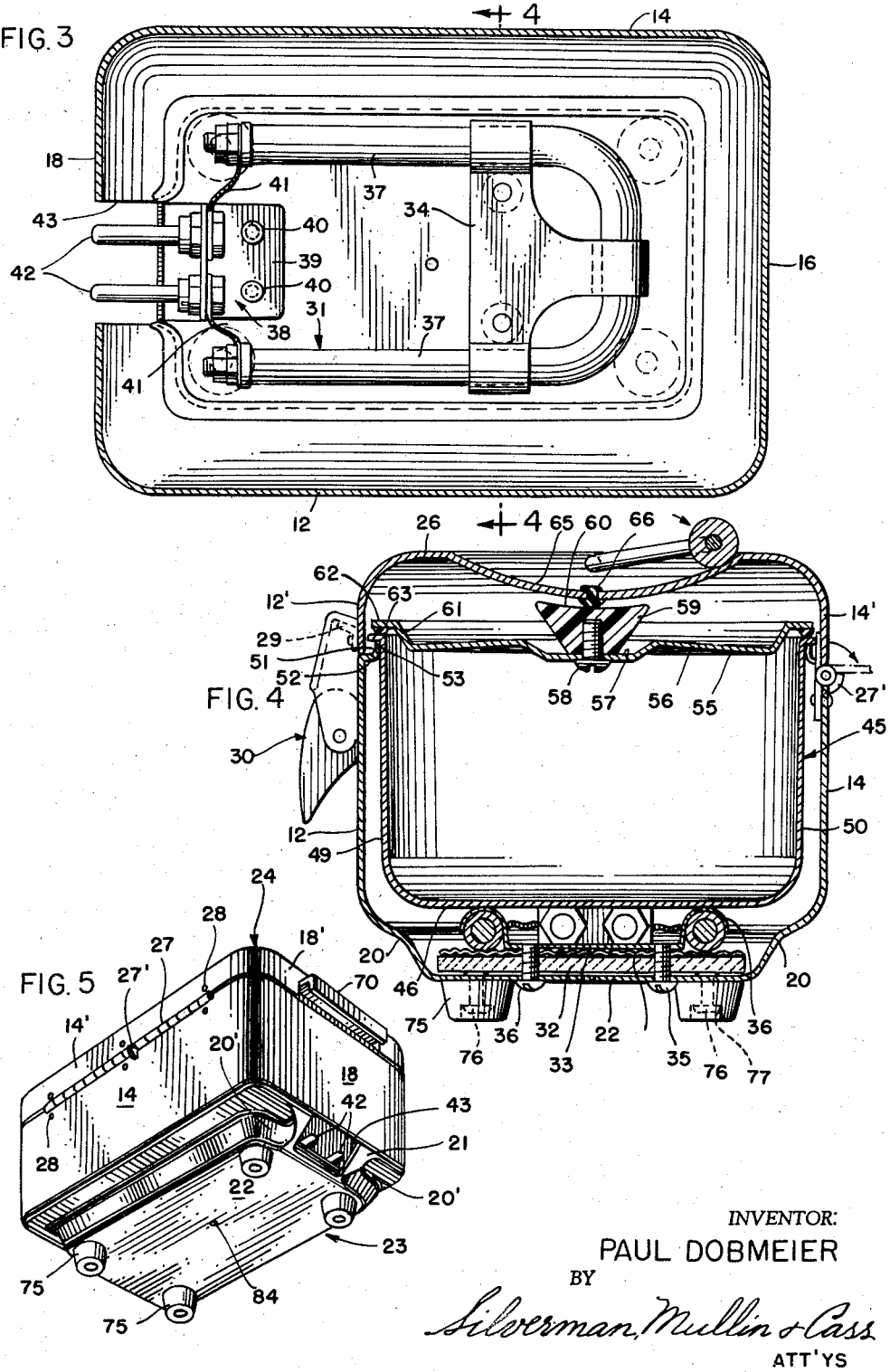
INVENTOR:
PAUL DOBMEIER
BY
Silverman, Mullin & Cass
ATT'YS United States Patent Office 2,889,443
Patented June 2, 1959

2,889,443

PORTABLE LUNCH WARMER

Paul Dobmeier, Chicago, Ill.

Application January 24, 1958, Serial No. 710,938

4 Claims. (Cl. 219—35)

This invention relates generally to food warming containers and more particularly relates to a portable lunch warmer of the character described which is characterized by a combination of structural features cooperating to provide for a highly improved degree of portability and compactness and singular advantages with respect to the transporting, warming and dispensing of food heretofore unavailable in devices of this kind.

Notwithstanding that devices of the general type with which the invention is concerned have heretofore been known, there has been a noteworthy absence of a portable food warmer appliance which is practicable and commercially attractive for more acceptable substantially universal use. For instance, construction workers are relegated mainly to cold sandwiches for lunch, although the benefits to be derived from a warm lunch at the construction site are easily recognized. The same applies for office workers who carry sandwiches for lunch. There are numerous other appropriately mentioned instances where a person has been relegated to a cold lunch of sandwiches where the need or preference for a warm lunch, or at least some additional warm food, could not be satisfied because of the absence of a suitable portable food warmer appliance.

There are many reasons believed to be responsible for this despite previous knowledge of such portable food warmer devices. Many of the previously known devices of this kind have been too bulky to carry unobtrusively, as for example, in the conventional lunch pail carried by laborers. In many cases, although the appliance might fit into the lunch pail, little if any space was left for other usually carried articles, such as a vacuum bottle or other food items. Still other appliances of this kind have been suitable for carrying solid foods, but were unsuitable for liquid or semi-liquid foods because they were not leakproof. Still others were difficult to clean or did not permit convenient preparation and dispensing of the food. The relatively high cost of such prior appliances also was a factor which deterred against public acceptance thereof. These and other reasons as well have contributed to the general antipathy of the general public to more universally accept and use devices of this kind.

Accordingly, it is a principal object of the invention to provide a portable lunch warmer of the character described which is advantageously constructed to embody certain desirable functional features designed to contribute to a more practicable and commercially attractive device of this kind than has heretofore been available.

Among the important objects of the invention are the provision of a novel portable lunch warmer of the character described which is very light-weight and compact and of suitable dimensions for being carried in the conventional lunch pail, for instance; which is suitable for carrying liquid or semi-liquid foods without spilling or leaking thereof; which has novel means for carrying an electric cord conveniently; which has a removable food receptacle enabling more convenient access to the food and easier cleaning of the device; and which is formed of a light-weight sturdy material capable of being decorated and embellished.

A further object of the invention is to provide a portable lunch warmer of the character described which comprises a container having a cover hingedly connected thereon and a food receptacle removably installed in the container having a lid removably seated across the mouth of the receptacle, said cover in its closed position having means bearing against the lid effectively to keep the receptacle sealed during transporting of the food warmer so that the liquid or semi-liquid foods may be carried without spilling.

Another object of the invention is to provide a food warmer device of the character described having vent means for release of moisture accumulated during warming of the food and drain means for draining of condensate accumulating at the bottom of the device.

A further object of the invention is to provide a lunch warmer device of the character described which is made entirely from aluminum to afford compactness; which is light-weight; is highly economical to manufacture; and is capable of warming food rapidly.

The foregoing and other objects of the invention will become apparent from the ensuing description in which a preferred embodiment has been disclosed and illustrated with particularity so as to instruct skilled artisans in the nature and practice of the invention. It is contemplated that minor variations in size, arrangement, proportion and construction of the several parts may occur to the skilled craftsman without departing from the scope or sacrificing any of the advantages of the invention.

In the drawing:

Fig. 3 is a sectional view taken through the device embodying the invention along the line 3—3 of Fig. 2 and in the general direction indicated.

Fig. 4 is a sectional view taken along the line 4—4 of Fig. 3 and in the direction indicated generally.

Fig. 5 is a bottom perspective view of the embodiment of the invention.

Figure 1:
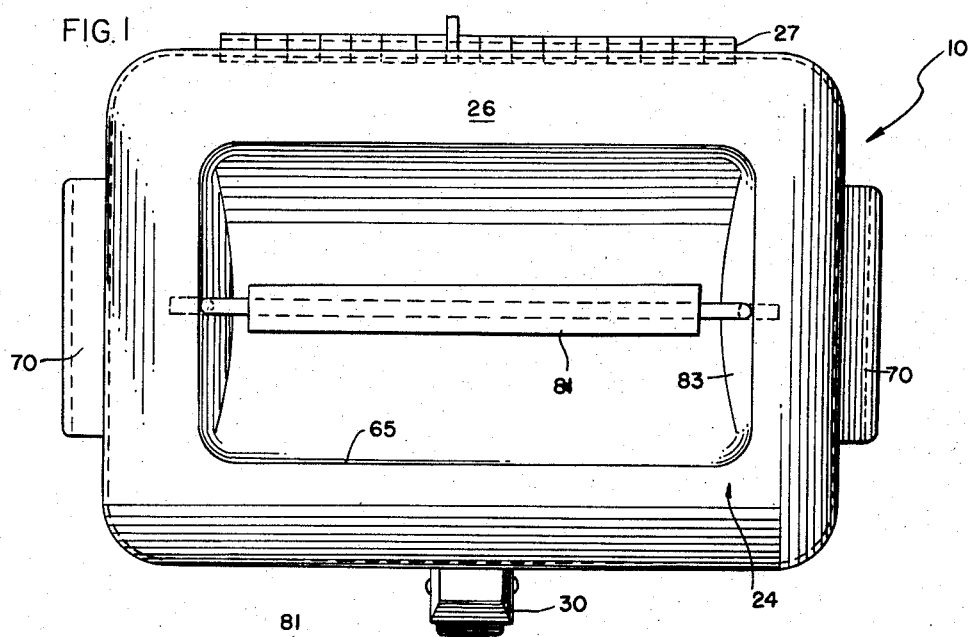
Fig. 1 is a top plan view of the portable lunch warmer embodying the invention and showing the cover closed.

Referring now to the drawings, the portable lunch warmer embodying the invention has been designated generally by the reference character 10. The outer carrying case or container for the device preferably includes a box-like integral shell 11 of generally rectangular configuration providing a front wall 12, a rear wall 14, and side walls 16 and 18. Each of the walls 12, 14 and 16 is inwardly turned adjacent its bottom extremity in a step formation 20 coextensive with the length thereof. Side wall 18 has a pair of spaced apart, similarly shaped step formations 20' which are connected by the intermediate, inwardly bent planar segment 21. The bottom wall 22 of the shell is connected to the bottom extremities of said walls to form an island-like formation 23 of reduced dimension protruding at the bottom of the shell which serves a special purpose to be subsequently explained.

A cover member 24 is hingedly connected on the shell for movement between positions covering and exposing the open upper end 25 of the shell. Said cover preferably is formed of the same material as the shell and comprises an inverted, shallow dish-shaped member having a transverse end wall 26 and depending walls 12', 14', 16' and 18'. The depending walls of the cover are arranged to correspond with the respective side walls of the shell identified by the same unprimed ordinal numerals since the shell and cover 24 are substantially identical in horizontal cross-sectional dimensions. The cover 24 is hingedly connected on the shell by means of an elongate or piano hinge 27 secured to walls 14 and 14' respectively as by rivets 28. Wall 12' of the cover mounts a laterally protruding latch post 29 advantageously positioned to be cooperatively engaged by the toggle latch member 30 mounted on wall 12 of the shell. Other suitable cooperating locking means for locking the cover 24 on the shell may be employed, the cooperating locking elements 29 and 30 being intended merely for illustrative purposes as providing a very secure locking for cover 24. In closed position, the cover 24 overlies the shell and is supported on the upper edges of the upstanding walls of the shell with the exterior surfaces of respectively engaged walls of the shell and cover substantially flush. Hinge 27 has an upstanding lug 27' which functions as a stop to limit the extent to which the cover may be rotated in open position so as not to tip over the device.

The heating element of the device 10 comprises a substantially U-shaped rod 31 containing high resistance electrical conductors supported flat on a pedestal on the bottom wall 22. Said pedestal includes an insulating plate 32, such as asbestos, engaged on the wall 22 and a corrugated sheet metal reflecting member 33 superimposed on member 32. The heating rod 31 is secured on top of the metal member 33 by means of the substantially T-shaped clamp strap 34, said insulating plate 32, metal member 33 and the clamp 34 being retained in suitable locked assembly by means of threaded fasteners, such as bolts 35 threadedly engaged therethrough from exterior of wall 22. The extremities of the three legs of said clamp 34 are each bent upwardly and formed in a downwardly opening hook formation 36 (Fig. 4) to be engaged over a portion of the rod 31, as seen in Fig. 3, so that the rod 31 is rigidly mounted spaced above the wall 22.

It will be seen from Fig. 3, the overall size of the heating element 31 is such as to overlie a major portion of reflecting member 33. Legs 37 of the heating element face toward side wall 18 of the shell 11 and are electrically connected at their free ends to a suitable binding post designated generally 38. The binding post may comprise a metal bracket having a laterally extending base portion 39 which is attached, as by rivets 40, to sheet 33 and base wall 22. Wire members 41 electrically connect the bracket to the free ends of legs 37. To an intermediate portion of said post 38 is secured a pair of electrical contact prongs 42 which are sufficiently long and arranged to protrude outwardly through a window 43 provided in segment 21 of wall 18. The reflective member 33 preferably is formed of aluminum, so that same will reflect heat from the element 31 and advantageously assist in rapid warming of the food carried in the receptacle.

The receptacle for carrying and warming food is designated generally 45. Same has a bottom wall 46 and upstanding side walls 47, 48, 49 and 50 integral with said bottom wall 46 so that the upper end of the receptacle 45 is open. The size of the receptacle 45 is selected so that same can be telescoped into the shell 11 with the side walls 47 through 50 spaced respectively from side walls 12, 14, 16 and 18 of the shell 11.

Figure 2:
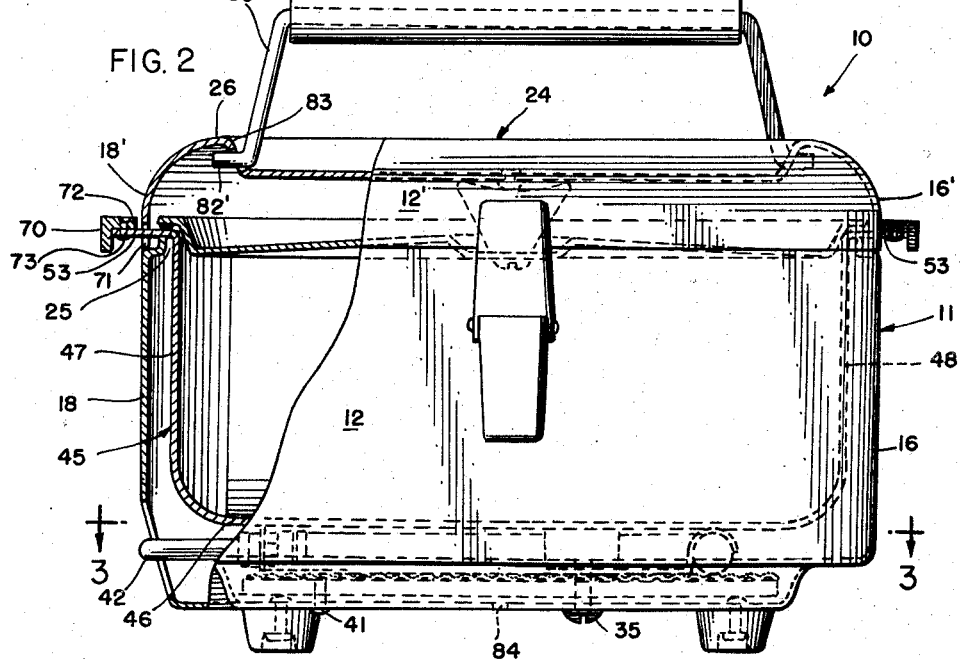
Fig. 2 is a front elevational view of the same with portions of the front wall broken away and other portions in section to illustrate details of the structure.

Referring to Figs. 2 and 4, the upper edges of the side walls 12, 14, 16 and 18 each are bent to provide an upstanding flange 51 offset inwardly from the wall and a generally horizontally arranged segment 52 connecting the flange with the wall. The upper edges of the receptacle 45 are bent at right angles outwardly of the side walls thereof to provide a generally horizontally arranged peripheral lip or flange 53. The size of the receptacle is selected so that when inserted into the shell 11, the bottom wall 46 rests on the heating element 31 and the peripheral lip or flange 53 is supported on the upstanding flanges 51 provided on the side walls of the shell 11. In the closed position of the cover 24 seen in Fig. 4, it will be noted that the bottom edges of the side walls of the cover engage upon the horizontal segments or ledges 52 and that the flanges 51 are arranged received on the interior of the cover or spaced upwardly from the segments or ledges 52.

There is provided a lid 55 which is adapted to be removably seated across the open upper end of the receptacle 45. As seen in Fig. 4, said lid comprises a substantially planar member having a medial offset body portion 56 provided with a shallow upwardly opening well 57. Secured upstanding upon the bottom of said well 57 by means of threaded fastener 58 is knob 59 formed of a thermally insulative plastic material, such as bakelite. The knob 59 is of sufficient size to protrude outwardly from well 57 and beyond the medial segment 56 of said lid. The upper surface 60 of said knob has a shallow concavity therein. Said medial body segment 56 has an upstanding peripheral extension 61 which in turn is continued laterally outward into a generally horizontally arranged perimetric flange 62. The lid 55 is capable of being seated across the open end of the receptacle 45 with the body segment 56 inside the receptacle and the flange 62 positioned above the flange 53 of the receptacle. The underside of flange 62 has a flexible gasket member 63 affixed thereto coinciding with the flange 53 when the lid is covering the receptacle 45.

In order to prevent the lid 55 from being dislodged from the receptacle 45, cover 24 has a medial concave depression 65 therein, the center of curvature of which coincides approximately with the center of curvature of surface 60 of the knob 59 when the cover is in closed position shown in Fig. 4. At approximately the center of said depression 65 is provided a bumper 66 of some kind. With the lid 55 installed and the cover 24 moved to a position closing the shell 11, said bumper 66 is disposed to bear downwardly against the knob 59. Thus, when the cover 24 is locked by means of cooperating latch elements 29 and 30, said bumper bearing downwardly upon knob 59 prevents the lid 55 from being dislodged, even if the device 10 is inverted. Simultaneously, pressure downwardly against the lid 55 as exerted by the closed cover effects a sealing of the receptacle against leakage or spilling of the contents thereof by reason of the gasket being compressed along its entire extent on the flange 53. Bumper 66 may be a simple protuberance on the bottom of the cover.

The invention also provides handle means for lifting the receptacle 45 from the device or placing same thereinto containing warm food. Said means comprise a pair of handles 70 formed of a thermally insulative material such as phenolic resin. Referring to Fig. 2, the outwardly projecting flange 53 on each of the side walls 47 and 48 of the receptacle has been elongated so that same may project outwardly of the shell 11. For this purpose, the walls 16' and 18' of the cover member have a suitable cut-out 71 therein through which a said elongated flange 53 may be extended. To the exteriorly disposed extremity 72 of each such flange 53 is attached, as by riveting 73, a handle 70 which is conveniently positioned for handling receptacle 45. It will be appreciated also that said handles 70 may cooperate with the adjacent portions of the locked cover to prevent shifting of the receptacle inside the shell 11, although the upstanding flanges 51 also bear against adjacent walls of the receptacle to help prevent such inadvertent shifting thereof inside the device. In order to lift the lid 55, it is necessary first to swing cover 24 to open position thereby exposing the lid.

The device has a plurality of leg members 75 attached to the exterior surface of bottom wall 22 by bolts 76. The bottom surface of each leg 75 is countersunk as at 77 to accommodate the head of the bolt therein. Each leg 75 is formed of a thermally insulative material, such as phenolic condensate resin or hard rubber.

The device 10 may be operable from a conventional 115 volt outlet to which same may be connected by means of the conventional electrical cord having a female plug at one end for reception of the prongs 42 and a male plug at the opposite end for connection to the familiar wall outlet, for instance. Of course, other appropriate electrical connectors may be employed on the end of the cord to be connected to a source of power, depending upon the type of source intended to be tapped. Also, suitable adapter components may be provided to enable connection of the device to more than one source of power. Regardless of the source of power contemplated to be tapped, the electrical cord may be connected to the prongs 42 and during non-use of the device, said cord wrapped around the depending island-formation 23. For this purpose said formation 23 is of sufficient size to accommodate a plurality of turns of the cord. When it is desired to use the device, the cord may be unwrapped from the formation 23 and plugged into the available source of power. Thus, the device 10 provides conveniently means for carrying the electrical cord associated therewith at all times and within convenient reach for immediate use of the device.

For purposes of carrying the device, there is provided a handle or bail 80 having a thermally insulative sheath or covering 81. As seen in Fig. 2, said handle 80 comprises an elongate shaped wire member having terminal trunnion formations 82 journalled in suitable bearing openings provided in the facing lateral walls 83 of the depression 65 formed in the wall 26 of said cover 24. The handle 80 is pivotally installed on said cover 24 and may be moved to a position partially received in said depression 65 as seen in Fig. 4 so as to be unobtrusive when not being used.

An escape vent 84 (Fig. 2) is provided in wall 22 of the shell for drainage of condensate collecting on the bottom of the shell 11.

In forming the shell 11, cover 24, receptacle 45 and lid 55, it is desired to use a strong, light-weight material. In addition, since the receptacle is disposed in contact with the heating element 31, a good thermal conducting material is desired for the receptacle. Further, in the interest of economy, an inexpensive, readily worked material is preferred. Considerable success has been realized with aluminum sheet material of relatively thin gauge. It is contemplated that the shell and cover may be formed of a different material, such as any one of a number of synthetic plastics suitable for withstanding heat generated by the element 31 for warming the food in the receptacle.

As an example of the compact, portable nature of my device, some pertinent dimensions of a successful model of the invention are set forth:

A. Outside dimensions of device 10 (approximate):
  Height _____ inches__ 4
  Length _____ do____ 5¾
  Width _____ do____ 4
B. Capacity of receptacle 45 _____ pints__ 1¼
C. Total weigh of device without food__ounces__ 18

From the above statistics it will be apparent the device is capable of being placed in a lunch pail and still afford space for other articles. The food placed in the receptacle 45 is intended to be pre-cooked, the heating element employed being sufficient to warm same within a relatively short period of time by reason of the physical contact between receptacle 45 and the rod 31 and reflective member 33. The handles 70 permit the receptacle to be easily handled without burning the hands. Handle or bail 80 likewise permits the cover 24 to be manipulated without inconvenience by reason of the warming procedure. The exterior surfaces of the shell 11 and cover 24 may be decorated and embellished although it is primarily intended that the device 10 be most conveniently transported in the conventional lunch pail.

It is believed the invention has been described in sufficient detail to enable the skilled artisan to understand and practice the same. In construing the claims hereto appended, it is intended the widest latitude and scope be afforded the language thereof commensurate with the progress in the arts and sciences contributed by the invention.

I claim:

1. A portable food warmer comprising, a box-like outer shell having a hinged cover thereon, a relatively flat electrical heating element on the bottom of the shell and overlying a substantial portion thereof, said shell having an opening in a wall thereof to provide access for connecting electrical power carrying conductors to said element, a dish removably telescoped within said shell and supported on edge portions of the shell above the heating element to be heated thereby, a cover for said dish, said dish cover and hinged cover having cooperable means engaging when the shell cover is in closed position upon the shell to hold said dish and dish cover in place, and means for latching said hinged cover in said closed position, said dish having outwardly extending peripheral flanges engaged upon said edge portions and handle means protruding outwardly of the shell in the closed condition of the hinged cover.

2. A portable food warmer comprising, a substantially rectangular outer case having front, rear, bottom and side walls, a cover member hingedly connected on said rear wall, cooperative toggle latch means attached on said front wall and the cover member for locking the cover member in closed position on the case, said bottom wall being smaller in area than the cross-sectional area of the case and connected to the bottom edges of the front, rear and side walls by a step-formation substantially continuous around the perimeter of the case, one of said side walls having an opening adjacent the bottom edge thereof, a relatively flat electrical heating element overlying a substantial portion of said bottom wall and connected to a pair of electrical contact prongs adjacent said opening, said prongs protruding outwardly through said opening, a dish disposed within said casing having peripheral flange means for supporting said dish on the upper edges of said front, rear and side walls, the bottom of the dish arranged to be heated by said element, a plate-like lid for the dish, said lid and hinged cover having facing means cooperable to hold the dish and lid in place when the cover is in closed position, said dish having handle means mounted on the peripheral flange means thereof, said handle means extending outwardly of the food warmer in the closed condition of the cover.

3. A food warmer as described in claim 2 in which said front, rear and side walls each have an upstanding flange offset inwardly from the body of the wall at the upper end of the wall, said flange means are supported on the end faces of said upstanding flanges, each upstanding flange being connected to a said body of the wall by a substantially horizontally disposed segment, said cover member comprising an inverted, shallow dish-shaped member, the bottom edges of the lateral walls of said cover member seated on said horizontal segments in the closed condition of the cover member.

4. A portable food warmer comprising, a substantially rectangular outer case having front, rear, bottom and side walls, a cover member hingedly connected on said rear wall, cooperative latch means on said front wall and cover for locking the cover in closed position on the case, said bottom wall being smaller in area than the cross-sectional area of the case and connected to the bottom edges of the front, rear and side walls by a step-down formation substantially continuously around the perimeter of the case, one of said side walls having an opening adjacent the bottom edge thereof, an electrical heating element overlying a substantial portion of the bottom wall and connected to electrical contact prongs protruding outwardly through said opening, a dish on the interior of the casing having right angle flanges extending outwardly around the periphery of the dish, said flanges engaged upon the upper edges of said front, rear and side walls to support the dish in the casing overlying the heating element, a lid for the dish supported on said flanges, said lid and hinged cover having facing portions cooperable to press the lid downwardly against the flanges to hold lid and dish immovable in the casing when the cover is so locked.

References Cited in the file of this patent

UNITED STATES PATENTS

| | | |
|---|---|---|
| 1,730,403 | Boland | Oct. 8, 1929 |
| 2,513,218 | Turnipseed | June 27, 1950 |
| 2,536,776 | Smellie | Jan. 2, 1951 |
| 2,585,310 | Gronlund | Feb. 12, 1952 |
| 2,658,986 | Gronlund | Nov. 10, 1953 |